US012580789B1

(12) United States Patent
Poverennyy

(10) Patent No.: US 12,580,789 B1
(45) Date of Patent: Mar. 17, 2026

(54) MEDIA ACCESS CONTROL (MAC) TO PHYSICAL CODING SUBLAYER (PCS) DATA RATE SYNCHRONIZATION CIRCUITRY

(71) Applicant: Synopsys, Inc., Sunnyvale, CA (US)

(72) Inventor: Denis Georgievich Poverennyy, Aschheim (DE)

(73) Assignee: Synopsys, Inc., Sunnyvale, CA (US)

( * ) Notice: Subject to any disclaimer, the term of this patent is extended or adjusted under 35 U.S.C. 154(b) by 44 days.

(21) Appl. No.: 18/888,084

(22) Filed: Sep. 17, 2024

(51) Int. Cl.
| | |
|---|---|
| *H04L 12/40* | (2006.01) |
| *H04L 1/00* | (2006.01) |
| *H04L 1/16* | (2023.01) |
| *H04L 1/1607* | (2023.01) |
| *H04L 12/00* | (2006.01) |
| *H04L 43/0817* | (2022.01) |

(52) U.S. Cl.
CPC ............ *H04L 12/40* (2013.01); *H04L 1/0041* (2013.01); *H04L 1/1657* (2013.01); *H04L 43/0817* (2013.01)

(58) Field of Classification Search
CPC ..... H04L 12/40; H04L 1/0041; H04L 1/1657; H04L 43/0817
See application file for complete search history.

(56) References Cited

U.S. PATENT DOCUMENTS

| | | | | |
|---|---|---|---|---|
| 10,491,370 | B2 * | 11/2019 | Yang ...................... | H04L 1/0042 |
| 11,101,923 | B2 * | 8/2021 | Khan .................... | H04J 3/0697 |
| 11,281,250 | B2 * | 3/2022 | Horn ......................... | G06F 1/04 |
| 2023/0023258 | A1 * | 1/2023 | Laursen .............. | H04J 14/0209 |
| 2025/0240119 | A1 * | 7/2025 | Poverennyy ............ | H04L 69/14 |

* cited by examiner

*Primary Examiner* — Justin R Knapp
(74) *Attorney, Agent, or Firm* — Patterson + Sheridan, LLP

(57) ABSTRACT

A system includes a MAC layer and a PCS in communication with the MAC layer via a transmit data path. The transmit data path includes a data request signal transmitted from the PCS to the MAC layer and a data valid signal transmitted from the MAC layer to the PCS. A SYNC pipeline of the PCS generates a copy of the data valid signal that has a same timing as the data valid signal. When the data valid signal from the MAC layer to the PCS matches the copy of the data valid signal generated by the PCS, the PCS is in synchronization with the MAC layer. When the data valid signal from the MAC layer to the PCS does not match the copy of the data valid signal, the PCS ignores input data from the MAC layer and generates an idle symbol to a link partner.

20 Claims, 8 Drawing Sheets

500

700

MEDIA ACCESS CONTROL (MAC) TO PHYSICAL CODING SUBLAYER (PCS) DATA RATE SYNCHRONIZATION CIRCUITRY

TECHNICAL FIELD

The present disclosure generally relates to circuits. More specifically, the present disclosure relates to media access control (MAC) layer to physical coding sublayer (PCS) data rate synchronization circuitry.

BACKGROUND

In modern high-speed communication systems, the transmit data path from the media access control (MAC) layer to the physical coding sublayer (PCS) is a component responsible for ensuring accurate and efficient data transmission. Such a path involves rate matching and the insertion of alignment markers (AMs) at the PCS layer, which are valuable for maintaining data integrity and synchronization across the transmission medium. However, these processes introduce additional storage requirements and latency, potentially limiting the overall efficiency for different data transmission applications.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
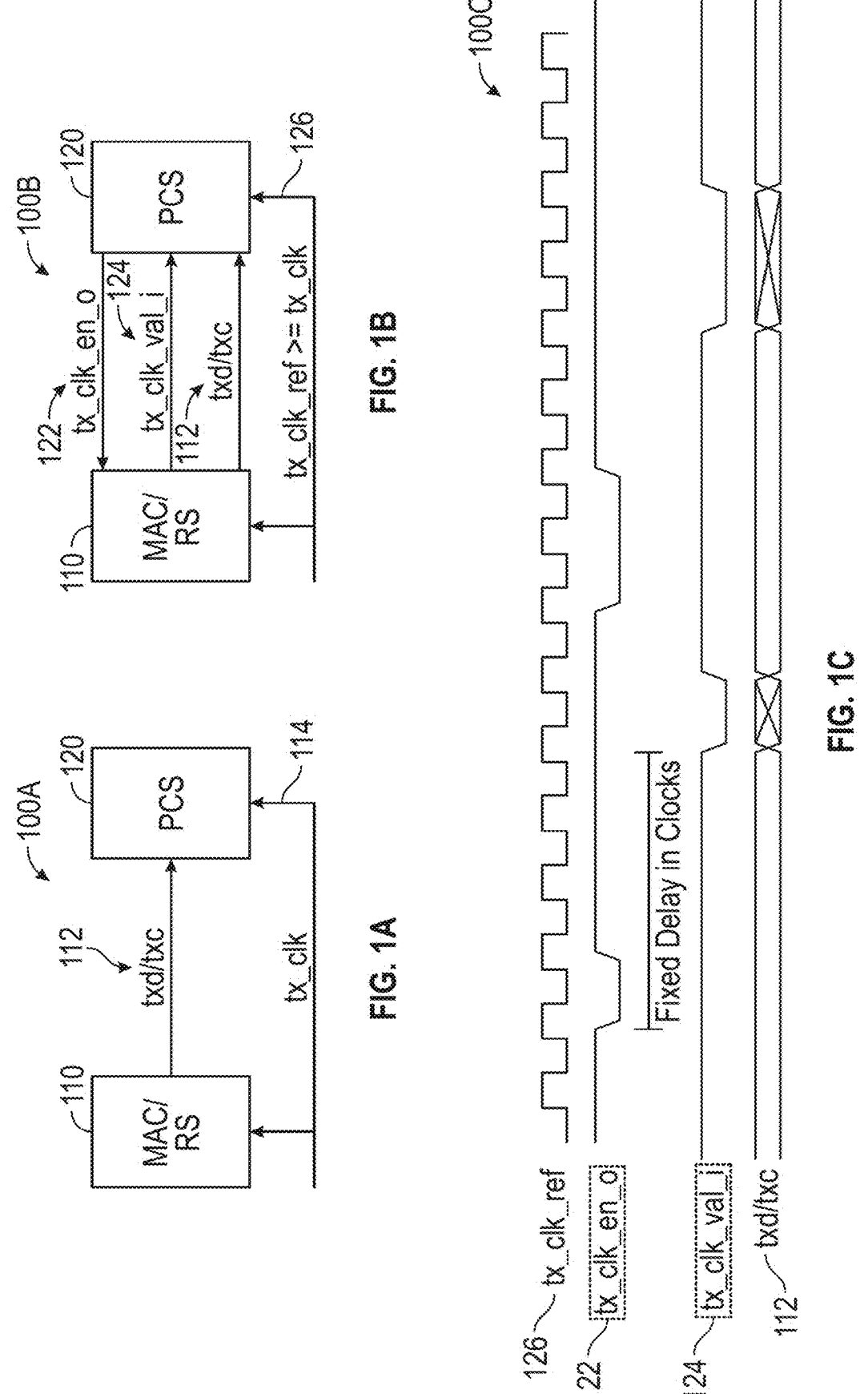
FIG. 1A illustrates a transmit path between the media access control (MAC) layer and the physical coding sublayer (PCS), according to one embodiment.
FIG. 1B illustrates the present transmit path between the MAC layer and the PCS, according to one embodiment.
FIG. 1C illustrates a timing diagram of the signals of the present transmit path, according to one embodiment.

Aspects of the present disclosure relate to circuits, and, in particular, to media access control (MAC) layer to physical coding sublayer (PCS) data rate synchronization circuitry.

The MAC layer is responsible for framing, addressing, and controlling access to the physical transmission medium. The MAC layer prepares data for transmission by segmenting the data into frames and adding headers, trailers, and other control information. The MAC layer outputs a stream of frames, usually in the form of Ethernet frames, which include the destination and source MAC addresses, payload data, and frame check sequence (FCS) for error detection.

The PCS is a sublayer within the physical layer (PHY) that is responsible for encoding and decoding data to ensure the data can be reliably transmitted over the physical medium. In the case of 10GBASE-R, the PCS uses a 64b/66b encoding scheme. The XGMII (e.g., 10 Gigabit media independent interface) serves as the interface between the MAC layer and the PHY layer. The XGMII provides a standardized way for the MAC layer to hand off data to the PHY layer. The data is transmitted across the XGMII interface in 32-bit words, along with control signals that indicate the validity of the data and delimit the frame boundaries.

The term "Base-R" refers to a family of physical layer interfaces defined by the Institute of Electrical and Electronics Engineers (IEEE) 802.3 standard for Ethernet, particularly for high-speed communication over fiber optic or copper cables. The "R" stands for "Reach" and signifies that these interfaces are designed for relatively long-distance communication. Base-R interfaces are part of the IEEE 802.3 standard, which defines Ethernet communication at various speeds. One example is 10GBASE-R, which is part of the 10 Gigabit Ethernet (10GbE) standard. Base-R interfaces use 64b/66b encoding. This encoding method converts 64 bits of data into a 66-bit format for transmission, adding two bits for synchronization. The purpose of this encoding is to ensure there are enough transitions in the bitstream to allow for accurate clock recovery by the receiver. In the Base-R interfaces, the PCS handles encoding and decoding of data, such as 64b/66b encoding, scrambling, and alignment marker insertion for all speeds starting with 25 GbE. The 10GbE is the only standard from Base-R family that does not use alignment marker insertion.

Regarding the PCS, the 64b/66b encoding process maps 64-bit blocks of data into 66-bit codewords. This encoding adds two bits of overhead to every 64 bits of data, which are used to indicate whether the following 64 bits include data or control information. This helps maintain synchronization and ensures a sufficient number of transitions in the bitstream for clock recovery at the receiver. The 66-bit encoded data is then scrambled to randomize the bit pattern. Scrambling helps to reduce electromagnetic interference (EMI) and maintain signal integrity over the physical medium. Alignment markers (AMs) are then inserted at regular intervals to enable the receiver to deskew the PCS lanes, and reassemble the aggregate stream (for all speeds starting with 40 GbE). In the case of 25 GbE, the AMs are used for codeword (CW) boundary detection. The scrambled and encoded blocks are then passed down to the Physical Medium Attachment (PMA) sublayer.

The transmit data path between the MAC layer and the PCS in high-speed Ethernet systems ensures that data is transmitted correctly and efficiently over physical media. The PCS is responsible for encoding, decoding, and other functions that prepare data for transmission. The transmit data path also includes mechanisms for rate matching and AM insertion, which are beneficial for maintaining data integrity and synchronization over high-speed links.

Data flows from the MAC layer to the PCS, where it undergoes encoding, rate matching, AM insertion, and AM insertion storage before being serialized and transmitted over the physical medium. The PCS uses techniques like "Idle" insertion and an elastic buffer to ensure that data is transmitted at the correct rate (rate matching), compensating for any clock differences between the MAC and physical layers. AMs are inserted by the PCS to maintain lane synchronization in multi-lane systems, ensuring correct data reassembly at the receiver. The AMs are generated by the AM pattern generator unit. Finally, the PCS serializes the processed data, converting the data into a continuous bit stream for transmission. However, such data flow causes significant transmit (TX) PCS latency jitter.

TX PCS latency jitter refers to the variability or fluctuation in the time it takes for data to pass through the TX side of the PCS in a network interface. In high-speed communication systems, understanding and managing latency jitter is valuable for ensuring reliable data transmission, especially in applications that involve precise timing, such as real-time communications or high-performance computing. Latency in the TX PCS refers to the time delay from when data enters the PCS (after being processed by the MAC layer) until the data exits the PCS and is ready to be serialized and transmitted over the physical medium. This latency includes the time taken for encoding (e.g., 64b/66b encoding), scrambling, and any other processing steps within the PCS. Jitter is the variation in latency over time. Jitter represents the difference between the longest and shortest time intervals for a particular processing step or series of steps. Jitter in the TX PCS can arise due to factors like variations in processing times within the TX PCS. Excessive jitter can lead to synchronization issues, particularly in systems that rely on precise timing (e.g., clock recovery, alignment of data streams, etc.).

To address these challenges, the example embodiments alter the transmit data path from the MAC to the PCS to eliminate the need for PCS rate matching. By reengineering this pathway, it is possible to streamline the data flow, reduce latency, and minimize storage overhead, thereby improving the performance of the communication system. This approach is particularly advantageous in environments where high-speed data transmission and low latency are needed, such as in data centers and high-performance computing networks.

The example embodiments provide for a method and system for better handling TX PCS latency jitter. The example embodiments provide for a MAC to PCS interface, that includes a data request signal from the PCS to the MAC layer and a data valid signal from the MAC layer to the PCS. The data request signal may be designated as tx_clk_en_o and the data valid signal may be designated as tx_clk_val_i. The tx_clk_val_i is a delayed copy (any number of clocks) of the tx_clk_en_o. This interface allows using a rate control scheme that requests neither Idle manipulation in the PCS nor a specific MAC/PCS clock frequency (e.g., only minimum frequency requirements). The data request from the PCS to the MAC (tx_clk_en_o) indicates the data rate at the xMII interface that is used for the serializer/deserializer (SerDes) rate. The present interface with the two additional signals does not impose any extra pipeline limitations between MAC and PCS compared to the standard interface. In operation, an internal copy of the tx_clk_val_i signal (tx_clk_val_int) is generated that has identical timing with the tx_clk_val_i (the data valid signal). The internal tx_clk_val_int is generated by the PCS and is a reference clock enable for the internal data path. If the internally generated tx_clk_val_int and the externally provided tx_clk_val_i do not match each other, the PCS ignores the input data and generates an Idle or remote fault to a link partner. If a match is provided between the tx_clk_val_int and the tx_clk_val_i, synchronization is achieved, and the input data is transmitted from the MAC layer to the PCS.

FIG. 1A illustrates a transmit path between the media access control (MAC) layer and the physical coding sublayer (PCS).

The interface 100A provides an interface between the MAC layer 110 and the PCS 120. Transmit (TX) data 112 is transmitted from the MAC layer 110 to the PCS 120. A data clock 114 is shown between the MAC layer 110 and the PCS 120.

One example interface between the MAC layer 110 and PCS 120 in high-speed Ethernet systems is the XGMII (10 Gigabit Media Independent Interface) for 10GbE, or similar variants for other speeds (e.g., CGMII for 100 GbE). The interface is designed to handle the transmission of data and control signals between the two layers.

The XGMII provides a standardized interface between the MAC layer and the PCS layer in 10GbE systems. The data path is usually 32 bits wide for each direction (transmit and receive), with separate paths for data and control information. XGMII usually operates at 156.25 MHz, with data transmitted in parallel (4 bytes per clock cycle).

FIG. 1B illustrates the present transmit path between the MAC layer and the PCS including two additional signals.

The interface 100B provides an interface between the MAC layer 110 and the PCS 120. The TX data 112 is transmitted from the MAC layer 110 to the PCS 120. A TX data clock reference 126 is shown between the MAC layer 110 and the PCS 120. The interface 100B includes two additional signals that are a data request 122 (tx_clk_en_o) signal from the PCS to the MAC layer and a data valid 124 (tx_clk_val_i) signal from the MAC layer to the PCS. The tx_clk_val_i (data valid 124) is a delayed copy (any number of clocks) of the tx_clk_en_o (data request 122). The interface 100B allows for using a rate control scheme that requests neither Idle manipulation in the PCS nor a specific MAC/PCS clock frequency (e.g., only minimum frequency requirements). The data request 122 from the PCS to the MAC (tx_clk_en_o) indicates the data rate at the xMII interface that is used for the serializer/deserializer (SerDes) rate. The interface 100B with the two additional signals does not impose any extra pipeline limitations between MAC layer 110 and the PCS 120 compared to other interfaces, as described in further detail below.

SerDes stands for Serializer/Deserializer, which is a pair of functional blocks used in high-speed communication systems to convert data between serial and parallel forms. SerDes is beneficial in systems where high-speed data needs to be transmitted over a limited number of physical connections (wires, traces, or optical fibers). The SerDes rate refers to the data transmission speed of the serial data stream generated by the SerDes system. This rate is often expressed in gigabits per second (Gbps) or megabits per second (Mbps) and is a metric in determining the performance of high-speed communication systems. The interface 100B may be used with SerDes systems.

The xMII is a term used to refer to a family of interfaces designed for communication between the MAC layer 110 and the PHY layer in network devices. The xMII covers the interfaces between MAC and PCS for all rates starting from 10G (XGMII) up to the 1.6 Terabit (1.6TMII). The xMII interfaces facilitate the connection and communication between the MAC and PHY components, enabling data transmission (TX) and reception (RX) over a network. xMII interfaces are used in Ethernet networking applications. In operation, the MAC layer 110 prepares data frames for transmission and sends them to the PHY layer via the xMII interface. The PHY layer encodes and transmits the data over the physical medium, such as an Ethernet cable. The PHY layer receives the incoming data from the network and decodes it. The decoded data is sent to the MAC layer through the xMII interface for processing.

Rate matching is performed to handle differences between the MAC data rate and the rate at which the physical medium can accept data. This is valuable in environments where the data clock between the MAC layer 110 and the physical layer may not be completely synchronized. The PCS 120 uses a technique known as Idle insertion/deletion for rate matching. Idles (non-data symbols) are inserted or removed from the data stream to adjust the rate. This process ensures that the data is neither too fast nor too slow for the physical medium. The PCS uses an elastic buffer to temporarily store data during rate matching. This buffer smooths out the data stream, compensating for any clock differences by absorbing variations. The interface 100B presents a rate control scheme that does not request idle, that is, does not use Idle insertion/deletion mechanisms. This also eliminates the need for an elastic buffer to store data before between Idle insertion/deletion can be performed between frames. As such, the interface 110B eliminates the need for the PCS rate match mechanism based on the Idle insertion/deletion. Thus, rate matching between the MAC layer 110 and the PCS 120 is removed.

Alignment markers (AMs) are special sequences inserted into the data stream to help maintain synchronization between the transmitter and the receiver, especially in systems using lane-based architectures like multi-lane Ethernet (e.g., 100GbE). The PCS inserts AMs at regular intervals within the data stream. The AMs help the receiver align the data streams across multiple lanes, ensuring that data arriving on different lanes can be correctly reassembled. The PCS temporarily stores data coming from the MAC in its memory during AM insertion. The storage and insertion process is carefully managed to ensure that the markers are correctly placed with specified AM period (a fixed interval between periodic AM insertion). In one implementation, the AM insertion and data stream from the MAC are independent of each other, that is, there is a storage that keeps receiving data during the AM insertion. After the AMs are inserted, a logic attached to the storage guarantees that the storage is being emptied before new AM insertions. The interface 110B and the present synchronization logic present a rate control scheme that does not need AM insertion storage. This eliminates the need for TX PCS memory. Thus, AM insertion storage is removed.

Therefore, the interface 110B, by using the data request 122 and the data valid 124, may remove the need for Idle insertion/deletion mechanisms, elastic buffers associated with the Idle insertion/deletion mechanisms, and storage or buffers associated with AM insertion. The interface 110B thus provides for decreased TX PCS latency jitter.

FIG. 1C illustrates a timing diagram of the signals of the present transmit path.

The timing diagram 100C shows the TX data clock reference 126, which is a square wave. The timing diagram 100C further shows the three signals communicated between the MAC layer 110 and the PCS 120. The TX data 112 is transmitted from the MAC layer 110 to the PCS 120. The first additional signal (the data request 122) may be designated as tx_clk_en_o and the second additional signal (the data valid 124) may be designated as tx_clk_val_i. As shown, the tx_clk_val_i (the data valid 124) is a delayed copy (any number of clocks) of the tx_clk_en_o (the data request 122).

Eliminating latency jitter caused by alignment marker (AM) insertion in high-speed communication systems, such as those found in Ethernet networks, can provide several significant benefits, including improved deterministic latency, enhanced quality of service (QoS), reduced buffering requirements, better synchronization, increased system stability and reliability, optimized bandwidth utilization, and improved performance in multi-lane systems.

By eliminating jitter related to AM insertion, the time it takes for data to traverse the system becomes more predictable. This deterministic latency is valuable in applications requiring consistent timing.

Reducing or eliminating jitter helps maintain a steady flow of data, which is beneficial for high-quality service in networks handling voice, video, and other real-time traffic. This leads to fewer delays, better synchronization, and a smoother user experience. By maintaining consistent timing, networks can reduce packet loss caused by buffer overflows or underflows, which are often exacerbated by jitter.

Without the variability introduced by AM jitter, systems may need less buffering to compensate for timing variations. This can lead to simpler design, lower memory usage, and reduced system complexity. Less reliance on buffering due to reduced jitter can also contribute to overall lower latency, which is useful in high-performance networking applications.

Eliminating the need for storage in the PCS to compensate for AM insertion offers several benefits, particularly in high-speed communication systems. These benefits can significantly impact the performance, efficiency, and complexity of the network. These benefits may include reduced latency, simplified hardware design, lower power consumption, reduced complexity in synchronization and timing, improved system reliability, cost reduction, and optimized bandwidth utilization.

Without the need for storage to buffer data and compensate for AM insertion, the overall processing time within the PCS is reduced. This leads to lower latency, which is beneficial in applications with fast data transmission. Eliminating storage allows data to flow more directly through the PCS, minimizing the delay introduced by buffering mechanisms.

The need for storage involves additional memory components, control logic, and associated circuitry. Removing these elements simplifies the hardware design, leading to fewer components and potentially smaller, more power-efficient devices. With fewer design complexities related to managing storage for AMs, the PCS can be used with reduced risk of design errors or integration issues.

Storage elements, especially those used for buffering, consume power. By eliminating the need for these components, the PCS can operate more efficiently, reducing overall power consumption. This is particularly useful in data centers and other environments where energy efficiency is a concern. Lower power consumption translates to less heat generation, reducing the need for cooling and contributing to a more environmentally friendly and cost-effective system.

The need for storage often involves additional clock management to synchronize data correctly with the AMs. Eliminating storage simplifies this process, reducing the complexity of timing and synchronization mechanisms.

Storage components, such as buffers, can be points of failure due to issues like memory corruption or timing errors. By eliminating these components, the overall reliability of the PCS is improved. Without the variability introduced by buffering, the PCS can deliver more consistent performance, reducing the likelihood of unexpected delays or data errors. Fewer storage components mean reduced material costs, making the overall system more cost-effective to produce. With a simpler design that lacks storage for AMs, testing, and validation processes can be more straightforward and less costly, as there are fewer variables to account for.

Therefore, eliminating latency jitter due to AM insertion enhances network performance by ensuring consistent, predictable latency, improving QoS, simplifying design, and increasing overall system reliability. These benefits are particularly beneficial in high-speed, real-time, and mission-critical applications where timing precision is key to successful operation. Further, eliminating storage in the PCS to compensate for AM insertion results in a range of benefits, including reduced latency, simplified hardware design, lower power consumption, improved system reliability, and cost savings. These advantages are particularly useful in high-speed, high-performance communication systems.

Figure 2:
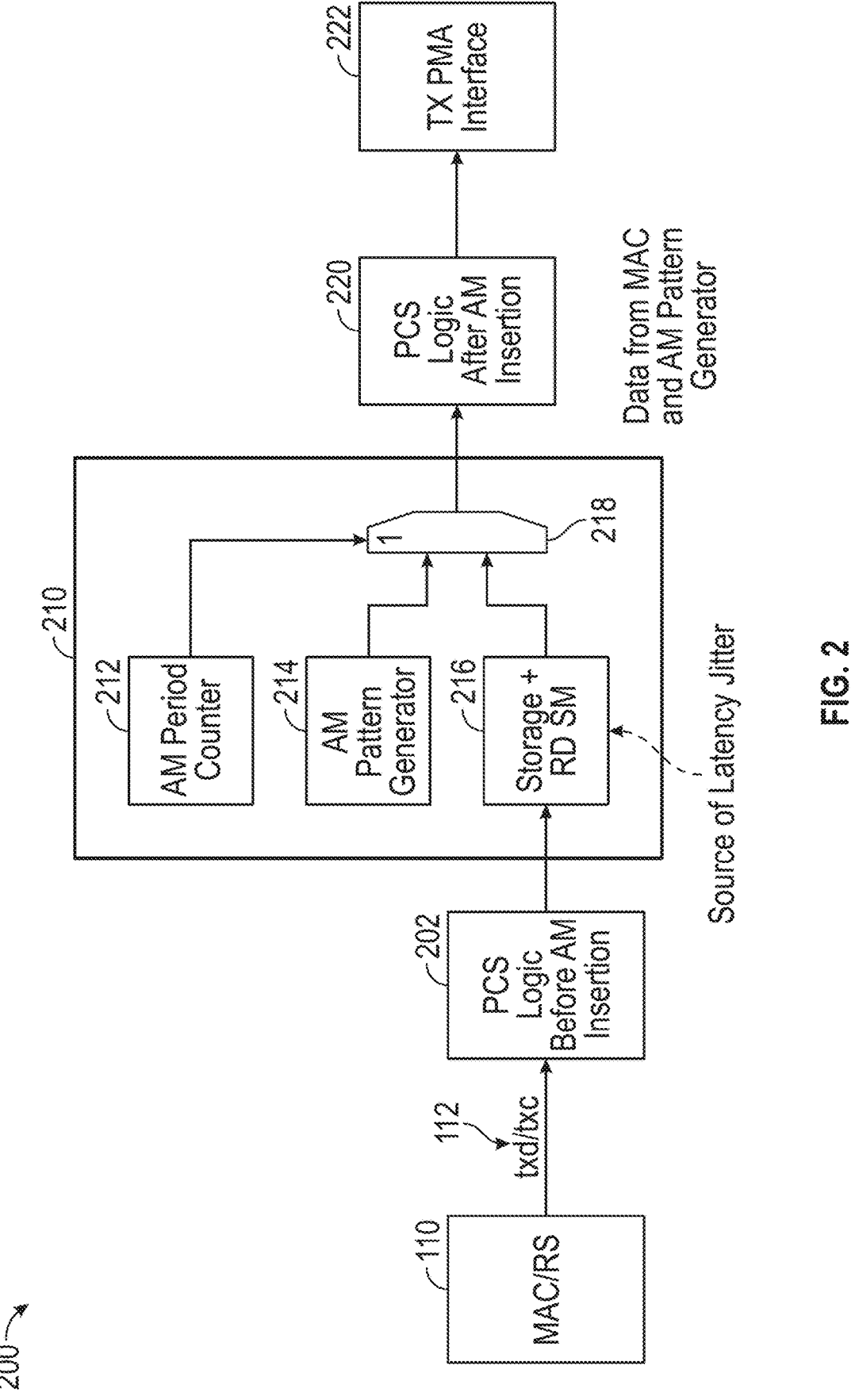
FIG. 2 illustrates a PCS including PCS storage, according to one embodiment.

FIG. 2 illustrates a PCS including PCS storage.

In the system 200, the MAC layer 110 communicates with the PCS 120 via a plurality of components. The MAC layer 110 send the TX data 112 to the PCS logic 202. The PCS logic 202 is logic before AM insertion. The PCS logic 202 may include data encoding, scrambling, block formation, buffering and rate matching, error detection, and alignment marker insertion preparation capabilities. The PCS logic 202 encodes the data. The encoded data is scrambled to ensure that the transmitted data has sufficient transitions and is less prone to issues like electromagnetic interference (EMI) and pattern-dependent effects in the transmission medium. Scrambling helps maintain signal integrity over long distances. The PCS logic 202 organizes the data stream from the MAC into the encoded fixed-size blocks and scrambles them. These blocks are the basic units of data that will be transmitted over the physical layer. Data may be buffered to match the data rate between the MAC layer 110 and the physical transmission layer. The PCS logic 202 may insert idle characters or adjust the data rate to ensure that the transmission rate aligns with the physical medium's rate. In some systems, the PCS logic 220 may include forward error correction (FEC) encoding to detect and correct errors during receiving. The AM period counter 212 determines a location in the data stream where the AMs will be inserted. AMs are a special set of 66 bit blocks used to facilitate lane alignment in multi-lane systems (also for detecting the code word boundaries for systems with FEC encoding). The TX PCS converts the data stream from the MAC into the 66 bit blocks and then inserts the AMs between a certain number of the blocks. On the receive side, the PCS detects the AMs and removes them. Thus, the AM can be inserted at any place in the data stream from the MAC (e.g., inside of the frame or between frames). However, because they are removed on the receive side by the PCS, the MAC receives the frames as they are being received.

The PCS logic 202 sends data to the AM insertion logic 210. The AM insertion logic 210 includes an AM period counter 212, an AM pattern generator 214, and incoming data storage 216 (i.e., incoming data storage during the AM insertion). Signals from the AM period counter 212, the AM pattern generator 214, and the incoming data storage 216 are fed into an AM/Data multiplexer 218, which provides the output to PCS logic 220 after AM insertion.

The AM period counter 212 is responsible for tracking when to insert AMs into the data stream. The AM period counter 212 counts the number of 66 bit blocks since the last AM was inserted. The AM period counter 212 is usually configured based on the specific protocol or standard being used. For instance, AMs may be inserted after a specific number of 66-bit blocks in 64b/66b encoding. In operation, the AM period counter 212 increments with each passing 66 bit block. When the AM period counter 212 reaches a predefined threshold (the point where an AM is inserted), the AM period counter 212 triggers the insertion of an AM. After insertion, the AM period counter 212 is reset, and the process begins anew.

The AM pattern generator 214 generates the specific bit pattern that serves as the AM. This pattern is unique and recognizable, ensuring that the receiver can reliably detect it. The AM pattern is designed to be distinct from regular data and control characters to avoid false detection. The pattern may also include error detection fields. In operation, when the AM period counter 212 signals that it's time to insert an AM, the AM pattern generator 214 outputs the predefined AM pattern. This pattern is then inserted into the 66 bit block stream at the appropriate location, replacing some of the normal data blocks or frames (i.e., the replaced data are temporarily stored in the incoming data storage 216).

The incoming data storage 216 is responsible for capturing and holding incoming data streams during insertion of the AMs. The incoming data storage 216 ensures that the data is ready for processing. The data received does not include AMs. Instead, the data received is the information that needs to be transmitted. The incoming data is temporarily buffered in the incoming data storage 216 to ensure that there is no data loss or misalignment during the AM insertion process.

After the AM/Data multiplexer 218, the PCS logic 220 performs all needed functions as FEC encoding (if needed), lane distribution, and then provides the data along with the inserted AMs to the TX physical medium attachment (PMA) interface 222.

The PCS logic 220 after the AM insertion may include transmission data blocks, line coding and encoding, lane distribution, and transmission to the PMA layer or TX PMA interface 222. After AMs are inserted into the data stream, the PCS logic 220 serializes the data blocks for transmission over the physical lanes. This involves converting parallel data (e.g., multiple 66-bit blocks) into a serial stream suitable for transmission over each lane.

In multi-lane systems, the PCS logic 220 ensures that data blocks, including the AMs, are evenly distributed across the physical lanes. This ensures that each lane carries a portion of the overall data stream. Depending on the transmission protocol, the PCS logic 220 may apply additional line coding to the serialized data. This may involve further encoding to ensure reliable transmission over the physical medium.

Figure 3:
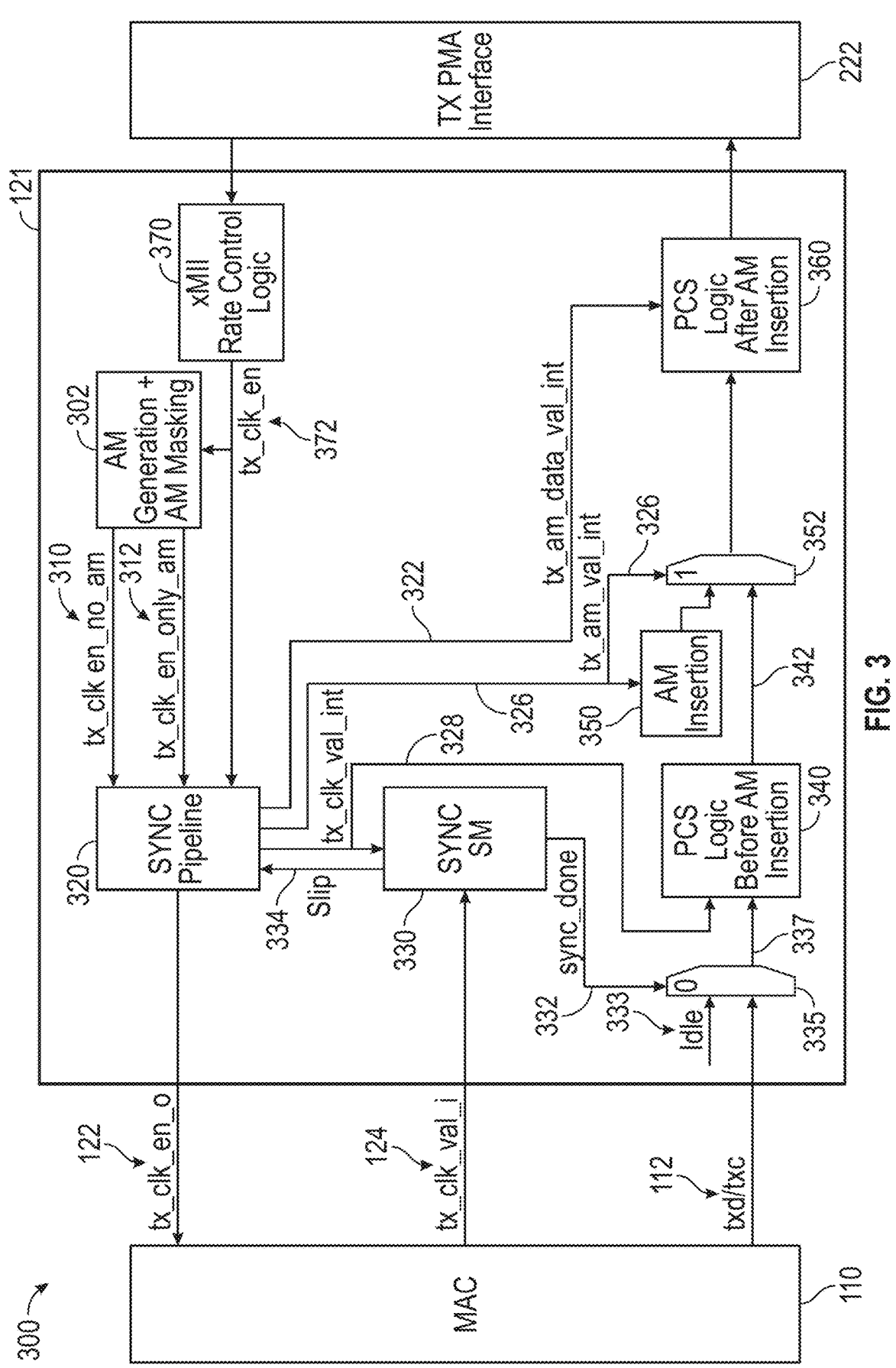
FIG. 3 illustrates the present PCS including a synchronization (SYNC) pipeline and a SYNC state machine (SM), according to one embodiment.
Figure 4:
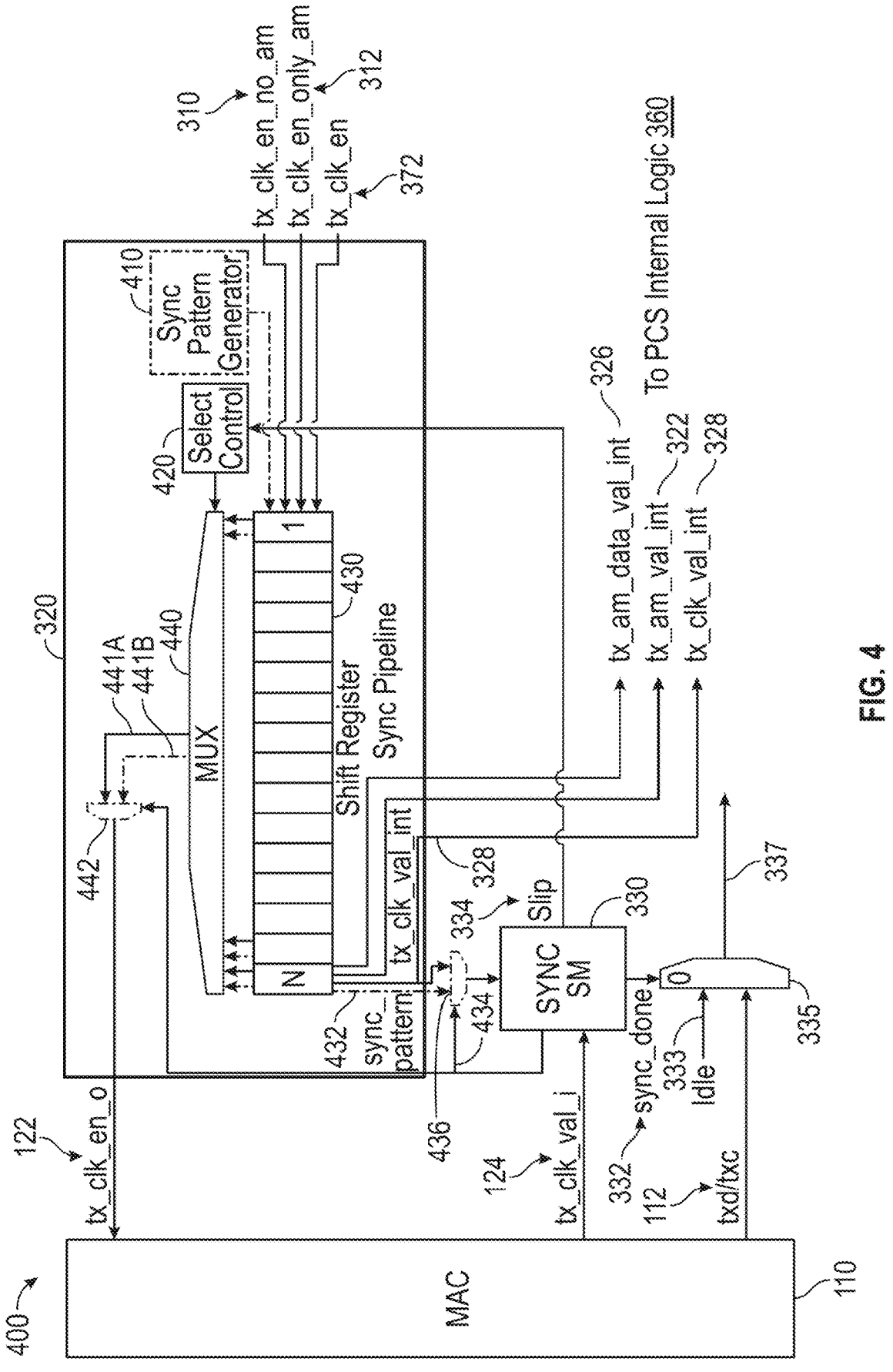
FIG. 4 illustrates the components of the SYNC pipeline, according to one embodiment.
Figure 5:
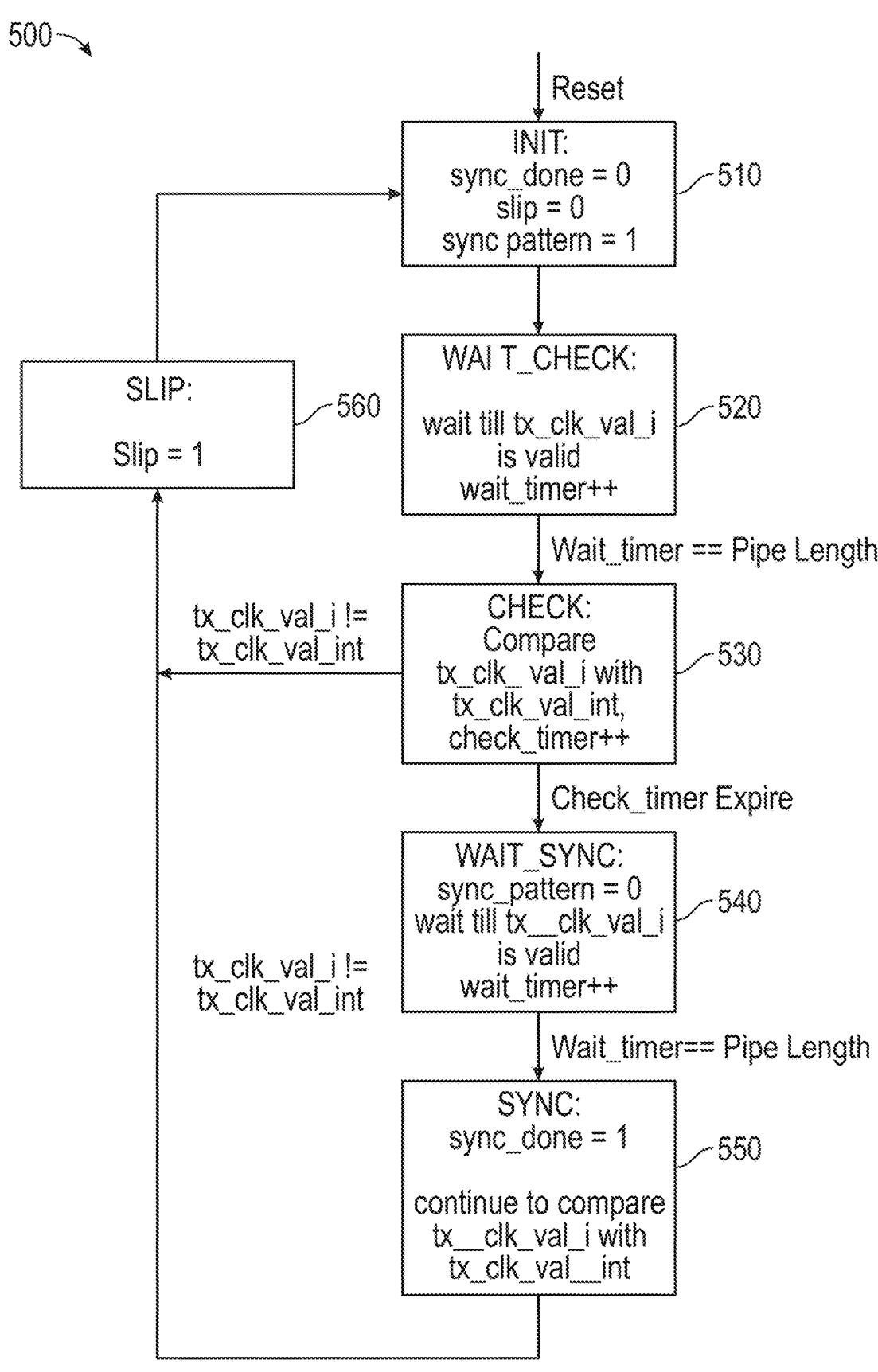
FIG. 5 illustrates a flowchart for using the present transmit path between the MAC layer and the PCS including the SYNC pipeline and the SYNC SM, according to one embodiment.

Therefore, the system 200 includes rate matching and PCS storage, which both contribute to latency jitter. For example, for a 100 GbE, the jitter caused by AM insertion may be about 12 nanoseconds (ns). FIGS. 3-5 below describe mechanisms for eliminating the latency jitter generated in FIG. 2.

FIG. 3 illustrates the present PCS including the xMII interface, a synchronization (SYNC) pipeline and a SYNC state machine (SM).

System 300 shows the MAC layer 110 communicating with the TX PMA interface 222 via PCS logic. The present PCS logic includes a SYNC pipeline 320 and a SYNC state machine (SM) 330. In one example, the SYNC SM 330 is implemented in hardware as part of a circuit that handles data reception and synchronization in high speed communication systems. The SYNC SM 330 may include, e.g., shift registers, flip flops, control logic, and counters. The SYNC pipeline 320 and the SYNC SM 330 are mechanisms (e.g., circuits) used for ensuring proper synchronization and alignment of data as it moves from the MAC layer 110 to the PCS 120, particularly in high-speed Ethernet systems like 100GBASE-R. Also, both the SYNC pipeline 320 and the SYNC SM 330 guarantee that the data from the MAC layer 110 and internally generated AMs do not overlap, and it signifies that no PCS storage is needed for the AM insertion. The SYNC pipeline 320 can be referred to as SYNC pipeline logic or circuitry.

The SYNC pipeline 320 is a sequence of stages or buffers in the PCS 120 to create a final data request to the MAC that manages the flow of data from the MAC layer 110 to ensure proper timing for AM insertion. The SYNC pipeline 320 ensures that data that enters the PCS does not overlap with AM insertion.

The SYNC SM 330 is a control mechanism within the PCS 120 that monitors the synchronization process between the MAC layer 110 and the PCS 120. The SYNC SM 330 monitors a synchronization status between the tx_clk_val_i and the tx_clk_val_int. If they are not in sync (if they are not identical), the TX PCS ignores input data and generates, via the PCS logic 202 (FIG. 2), the idles (the signal 333) and eventually provides them to the link partner. The link partner is a device or system on the other side of a network connection that is in communication with a local device. The link partner involves another network interface, transceiver, or physical layer device (PHY) that is connected to the same network link. In the case of a mismatch, the SYNC SM 330 instructs the SYNC pipeline 320 logic to use a next delay copy of the data request to the MAC. Stated differently, the next delay copy of the data request is the shifted output from the shift register 430. When the shift register 430 is used to delay the data request signal, each subsequent stage of the shift register 430 includes a shifted or delayed copy of the data request. If they are in sync, data transmission is enabled between the MAC layer 110 and the PCS 120, where TX data 112 is transmitted to an output 337 of multiplexer 335.

Together, these mechanisms are beneficial for maintaining data integrity and ensuring reliable communication between the MAC layer 110 and PCS layers in high-speed Ethernet systems. They handle the timing, alignment, and synchronization challenges that arise when transferring data across different layers and clock domains.

Referring back to FIG. 3, to provide such approach in the system 300, the PCS 120 generates an initial data request signal 372 (tx_clk_en) that provides a desired data rate. The desired data rate may also be referred to as the required data rate. Then the AM generator 302 splits the initial data request signal 372 into two signals: a first signal 310 for MAC data (tx_clk_en_no_am) and a second signal 312 for the internal AM insertion (tx_clk_en_only_am). An advance or initial copy of tx_clk_en_no_am (the first signal 310) is sent to the MAC layer 110 as tx_clk_en_o (or data request 122). However, the PCS 120 internally uses tx_clk_val_int (the signal 328) only. The SYNC SM 330 and the SYNC pipeline 320 (based on the shift register 430 of FIG. 4) generates the tx_clk_en_o (the data request 122) to guarantee that tx_clk_val_i (the data valid 124) and tx_clk_val_int (the signal 328) match each other. The SYNC pipeline 320 emulates a latency (or delay) between tx_clk_en_o (the data request 122) and tx_clk_val_i (the data valid 124) while the SYNC SM 330 checks if the tx_clk_val_i (the signal 124) and tx_clk_val_int (the signal 328) matches.

The PCS 120 generates an internal copy of the tx_clk_val_i signal (tx_clk_val_int or the signal 328) that has identical timing with tx_clk_val_i (the signal 124). The internal tx_clk_val_int is a reference clock enable for the internal data path. If the internally generated tx_clk_val_int and the externally provided tx_clk_val_i do not match each other, the PCS 120 ignores the input data and generates an IDLE (the signal 333) to a link partner. If a match is provided between the tx_clk_val_int and the tx_clk_val_i, synchronization is achieved, and the input data is transmitted from the MAC layer 110 to the PCS 120.

Thus, if the SYNC SM 330 detects a mismatch, then tx_clk_en_o (the data request 122) will be taken from the next tap of the SYNC pipeline register and so on. When synchronization is not achieved (i.e., tx_clk_val_i and tx_clk_val_int do not match), the PCS 120 ignores the MAC data and sends Idles (the signal 333) over the PCS data path to the link partner. As soon as synchronization is achieved (sync signal 332 or sync_done), the PCS 120 starts processing the MAC data (or the TX data 112). This mechanism guarantees that data from the MAC layer 110 and internally generated AMs do not overlap, and it signifies that no PCS storage is needed for the AM insertion.

Regarding the signals, tx_clk_en is an internally generated data request that guarantees the SerDes rate. The tx_clk_en (the initial data request signal 372) is generated by the xMII rate control logic 370. The tx_clk_en_o is an output signal to the MAC layer 110 with space for AM insertion. The tx_clk_val_i is a data valid signal from the MAC layer 110, which is a copy of the tx_clk_en_o with a constant delay (i.e., the delay can be caused by both the MAC processing time and pipeline stages between MAC and PCS). The tx_clk_val_int is a signal that is an internally generated data valid. After synchronization is complete, the tx_clk_val_int signal matches the tx_clk_val_i signal. The tx_am_val_int signal is an internally generated signal for determining whether to transmit AM patterns. The tx_am_data_val_int signal is an internally generated signal for determining a valid pattern for data and AMs.

The SYNC pipeline 320 provides the tx_am_val_int signal 326 to the AM/Data multiplexer 352. The SYNC pipeline 320 provides the tx_am_data_val_int (the signal 322) to the PCS logic 360 after AM insertion.

The tx_am_data_val_int signal (the signal 322) is an exact copy of the tx_clk_en taken from the most significant tap of the shift register 430. The tx_clk_en, and in turn, the tx_am_data_val_int are not dependent on the synchronization process (e.g., on the current state of the SYNC SM 330), but reflect a needed data rate to provide seamless data stream to the PMA.

The tx_am_val_int signal (the signal 326) is generated as follows. The AM Generation+AM masking Block (or AM generator 302) splits tx_clk_en in two signals, that is, tx_clk_en_no_am (310) and tx_clk_en_only_am (312). The tx_am_val_int signal (the signal 326) is an exact copy of the tx_clk_en_only_am (312) taken from the most significant tap of the shift register 430. The tx_clk_en_only_am reflects AM positions in the combined stream to the PMA. Same as the tx_am_data_val_int, the tx_clk_en_only_am, and in turn, the tx_clk_en_only_am, are not dependent on the synchronization process (e.g., on the current state of the SYNC SM 330). All three internal valid signals (tx_clk_val_int, tx_am_val_int, and tx_am_data_val_int) are used for delivering the combined stream to the PMA and are not affected by the synchronization process (e.g., on the current state of the SYNC SM 330). Thus, the tx_clk_val_int either picks data from the MAC layer 110 if the synchronization between MAC layer 110 and the PCS 120 is achieved or pushes the internally generated Idles if there is no synchronization. The tx_am_val_int inserts AMs. The tx_am_data_val_int further delivers the combined stream (data from the MAC layer 110 or internally generated Idles plus the AMs) to the PMA. Such approach guarantees that independently of the synchronization state between the MAC layer 110 and the PCS 120, the PCS 120 always provides a valid data stream to the PMA.

The SYNC pipeline 320 provides a signal 326 to the AM insertion 350. As noted above, when synchronization is not achieved, the PCS 120 ignores the MAC data and the multiplexer 335 between the MAC data and the signal 333 (IDLE) sends Idles (i.e., the signal 333 as input and a 337 as output of 335) to the PCS logic 340 before AM insertion. The PCS logic 340 also receives the signal 328. The output 342 of the PCS logic 340 is fed into the AM/Data multiplexer 352, which also receives data from the AM insertion 350. The output of the AM/Data multiplexer 352 is fed into the PCS logic 360 after AM insertion. The SYNC pipeline 320 ensures that the data transmitted from the AM generator 302 and the multiplexer 335 between the MAC data and the signal 333 (IDLE) remains aligned and synchronized.

Therefore, the PCS 120 controls the data rate of the interface by toggling tx_clk_en_o (the data request 122) to match the desired data rate. The PCS client (the MAC layer 110) follows the toggling of tx_clk_en_o by toggling the tx_clk_val_i (the data valid 124) identically but allowing for a fixed number of clocks delay (i.e., no dynamic delay is allowed). This allows the PCS client (the MAC layer 110) to implement optional pipelining as necessary to support the interface rate control/backpressure. The PCS client (the MAC layer 110) may choose to implement any fixed delay from 0 to MAX supported delay clock cycles. A delay of 0 means tx_clk_en_o (the signal 1222) is wired directly to tx_clk_val_i (the data valid 124).

FIG. 4 illustrates the components of the SYNC pipeline.

The system 400 shows the details of the SYNC pipeline 320. The SYNC pipeline 320 provisionally includes a provisional sync pattern generator 410. The sync pattern generator 410 produces specific, predefined sequences of bits (SYNC patterns) that are used for synchronization purposes. The SYNC patterns are transmitted to the MAC during the sync up process only. As soon as the synchronization between the MAC and the PCS is achieved, the PCS immediately starts sending tx_clk_en_o (the signal 122) that reflects the required data rate. The pattern generator can be helpful in the case when tx_clk_en_no_am is almost always constant. In this case, there is a high probability for a false synchronization that eventually will be detected and the synchronization process will be restarted. However, even in this case, the reliable synchronization will be achieved. The sequence of bits is provided by the sync pattern generator 410 to a shift register 430. The shift register 430 is used to handle serial data. The shift register 430 produces delayed copies of the input signals. The shift register's 430 depth (i.e., the maximum number of clocks that input signals can be delayed) are determined by the maximum possible delay between data request to the MAC (tx_clk_en_o) and data valid to the PCS (tx_clk_val_i).

As such, the sync pattern generator 410 generates a specific pattern (SYNC pattern) that needs to be sent to the MAC layer 110. The shift register 430 is used to generate delayed copies of this pattern. The most delayed copy of the sync pattern 432 is provided to a multiplexer 436 that selects between the sync_pattern 432 and the tx_clk_val_int (the signal 328). The multiplexer 436 receives the sync pattern 432, a sync pattern enable signal 434 (sync_pattern_en), and the tx_clk_val_int (the signal 328), and provides the output to the SYNC SM 330.

The bits from the shift register 430 are fed into a multiplexer 440 (or MUX 440). In the other words, the shift register 430 produces delayed copies of the input signals and sends them to the multiplexer 440. The shift register 430 has N taps. If the optional sync pattern generator 410 is not implemented, the multiplexer 440 receives N delayed copies of the original tx_clk_en_no_am (e.g., one signal per the register tap). If the optional sync pattern generator 410 is implemented, each tap of the shift register 430 also has a delayed copy of the sync_pattern along with the copy of tx_clk_en_no_am. The multiplexer 440 selects one shift register tap output based on the select signal from the select control circuit 420. Depending on the implementation, each tap output can include either only one signal (e.g., a corresponding copy of tx_clk_en_no_am; no optional sync pattern generator) or two signals (e.g., corresponding copies of both tx_clk_en_no_am and sync_pattern; the optional sync pattern generator 410 is implemented). If the optional sync pattern generator 410 is not implemented, the MUX 440 output is a single bit signal that corresponds a selected copy of the tx_clk_en_no_am. In this case, the MUX 440 output is directly sent as tx_clk_en_o to the MAC layer 110. If the optional sync pattern generator 410 is instantiated, the MUX 440 output is a two-bit signal (e.g., corresponding to the selected copy of the tx_clk_en_no_am and sync pattern). In this case, the MUX 442 selects between the two signals (441A and 441B) based on the select signal 434 from the SYNC SM 330. If the SYNC SM 330 is in a synchronization phase, a delayed copy (of the signal 441B) of the sync_pattern is selected, otherwise a delayed copy (441A) of the tx_clk_en_no_am is selected. In other words, the multiplexer 440 selects a delayed copy of the tx_clk_en_no_am (or tx_clk_en_no_am and sync pattern) based on a value of the select control circuit 420. If the optional sync pattern generator 410 is implemented, the MUX 442 selects between delayed copies of tx_clk_en_no_am and sync pattern depending on the SYNC_SM state and sends the final signal as the data request 122 (tx_clk_en_o) to the MAC layer 110 If the optional sync pattern generator 410 is not implemented, the output of the multiplexer 440 is directly sent as the data request 122 (tx_clk_en_o) to the MAC layer 110.

Additionally, a select control circuit 420 is in communication with the multiplexer 440. The select control circuit 420 controls the selection inputs of the multiplexer 440. The select control circuit 420 monitors input (Slip) 334 from the SYNC SM 330 and decides which inputs are to be sent to the multiplexer 440. As such, the select control circuit 420 generates a selection signal for the multiplexer 440.

In operation, the SYNC pipeline 320 provides the tx_clk_en_o signal (the data request 122) to the MAC layer 110. The tx_clk_val_int (the signal 328) is a delayed copy of the tx_clk_en_no_am (the first signal 310). The length of the shift register 430 reflects a maximal allowed latency between the tx_clk_en_o (the data request 122) and tx_clk_val_i (the data valid 124). After reset, the tx_clk_en_o (the data request 122) and tx_clk_val_int (the signal 328) are taken from the same uppermost tap of the shift register 430. The SYNC SM 330 checks if the tx_clk_val_i (the data valid 124) and tx_clk_val_int (the signal 328) match each other over a check period. If these two signals match, the SYNC SM 330 declares that the synchronization has been completed and the MAC's data/control are sent to the PCS 120.

Otherwise, if no match is detected, the SYNC SM 330 signals a mismatch by setting a slip pulse 334 to the select control circuit 420. Then the select control circuit 420 sends a signal to the multiplexer 440, that is, the tx_clk_en_no_am (the first signal 310) from the next shift register tap. A new copy of the tx_clk_en_no_am (the first signal 310) is sent to the MAC layer 110 as tx_clk_en_o. This procedure continues until the SYNC SM 330 signals that synchronization is complete or done (sync_done 332). As soon as synchronization is achieved, the SYNC SM 330 will continue to monitor tx_clk_val_i (the data valid 124) and tx_clk_val_int (the signal 328). In case a mismatch is detected, the sync procedure will be restarted.

Therefore, in operation, the AM generation and AM masking block (or the AM generator 302) periodically generates AM start pulses (tx_clk_en_only_am) 312 and generates the clock enable (tx_clk_en_no_am) 310 with a number of clocks where the AMs are to be inserted. The SYNC pipeline 320 includes the shift register 430 that is used to compensate a delay between tx_clk_en_o and tx_clk_val_i. The SYNC SM 330 monitors synchronization status between the tx_clk_val_int (the signal 328) and the tx_clk_val_i. If they are not in sync, the TX PCS ignores input data and generates idles (the signal 333) and eventually provides them to the link partner. If they are in sync, data transmission is enabled between the MAC layer 110 and the PCS 120.

Further, the PCS 120 is always running from the internally generated tx_clk_val_int (the signal 328) that is not manipulated. In other words, independently on the sync status, the TX PCS always sends valid data (either from the MAC layer 110 or internal generated idles (the signal 333)) with valid AMs to the link partner.

Also, the sync pattern generator 410 generates a pseudo random pattern that may be used during the synchronization process instead of the tx_clk_en_no_am (the first signal 310) to accelerate the synchronization process. The sync pattern generator is an optional block. The synchronization will always be achieved even without the pattern generation. However, depending on the reference clock frequency, the tx_clk_en_no_am (the signal 310) can be high or low most of the time, which may cause false sync detection. But even in this case, the synchronization will be eventually achieved as potentially all taps in the shift register 430 can be reached (i.e., shift by one position upon receiving the slip pulse 334 from the SYNC SM 330) until stable synchronization is reached. It means that the sync pattern generator 410 can decrease the synchronization process by avoiding the false synchronization states.

Therefore, according to FIGS. 3 and 4, a rate control scheme is used between the PCS 120 and the MAC layer 110 with two signals, the data request 122 and the data valid 124, where the data valid 124 is a delayed copy of the data request 122, without relying on idle insertion or PCS storage, which can be achieved through a carefully synchronized handshake mechanism. The data request 122 is a signal that is asserted by the MAC layer 110 (and initiated by the PCS 120) to indicate that it is ready to send data to the PCS 120 and the data valid 124 is a signal that is a delayed version of the data request 122, indicating that the data on the interface is valid and ready to be consumed by the PCS 120.

The rate control scheme does not insert/remove idle symbols to manage data flow, which means the data transmission needs to be continuous when active and the PCS does not store data, implying that the data transfer from the MAC layer 110 is closely coordinated with the ability of the PCS 120 to consume the data. By eliminating the PCS rate match and the data storage that accumulates data during AM insertion, the TX PCS latency jitter may be significantly reduced. Further advantages include no need for idle symbols to pad the data stream since the rate control is handled by the timing and synchronization of data request 122 and the data valid 124, and the PCS does not need to store data because it only reads data when it is valid (as indicated by data valid 124), which aligns with the data availability of the MAC layer 110. This rate control scheme, based on the synchronization of data request 122 and the data valid 124 signals, allows for efficient data transfer between the MAC layer 110 and the PCS 120 without relying on idle symbols or storage within the PCS 120. By carefully managing the timing of these signals, continuous data flow can be maintained, ensuring that the PCS 120 consumes data at the same rate the MAC layer 110 supplies it.

FIG. 5 illustrates a flowchart 500 for using the present transmit path between the MAC layer and the PCS including the SYNC pipeline and the SYNC SM.

At 510, the SYNC SM 330 provides initial synchronization between the PCS 120 and MAC layer 110, and monitors synchronization status during normal work. The "INIT" indicates the start of the synchronization process.

At 520, no synchronization check is performed during the transition time. As such, the method waits until the tx_clk_val_i is valid can be used for comparison. The wait time in the clock numbers is determined by the pipe length of the shift register 430 in the SYNC pipeline 320. During transition periods, such as when switching data rates or changing operational modes, synchronization between the MAC layer 110 and the PCS 120 is paused or not actively managed.

At 530, a comparison is made between the tx_clk_val_i (the data valid 124) and tx_clk_val_int (the signal 328) during a check interval. The result can be either a mismatch, where a new position is needed (next tap of the shift register 430), or a match, where the MAC data can be accepted.

At 540, no check is performed during the transition time. The method waits until the clock enable pipe is filled (similar to the state 520). This is used only when the sync pattern generator 410 is used.

At 550, the system enters into normal operation mode. The PCS 120 accepts the data from the MAC layer 110. Once the pipeline is filled and stable, data transmission resumes, and synchronization checks are reactivated. The MAC layer 110 and the PCS 120 operate in normal mode with proper synchronization, handling data according to the new data rate or mode.

At 560, a slip pulse 334 is used as a signal to indicate and manage mismatches. The slip pulse 334 serves as a corrective signal to adjust or realign data or timing. When a mismatch is detected, the slip pulse 334 is sent to the select control circuit 420 to restart the synchronization process. The slip pulse 334 forces the SYNC pipeline 320 to use the next copy of the tx_clk_en_no_am (the first signal 310).

Figure 6:
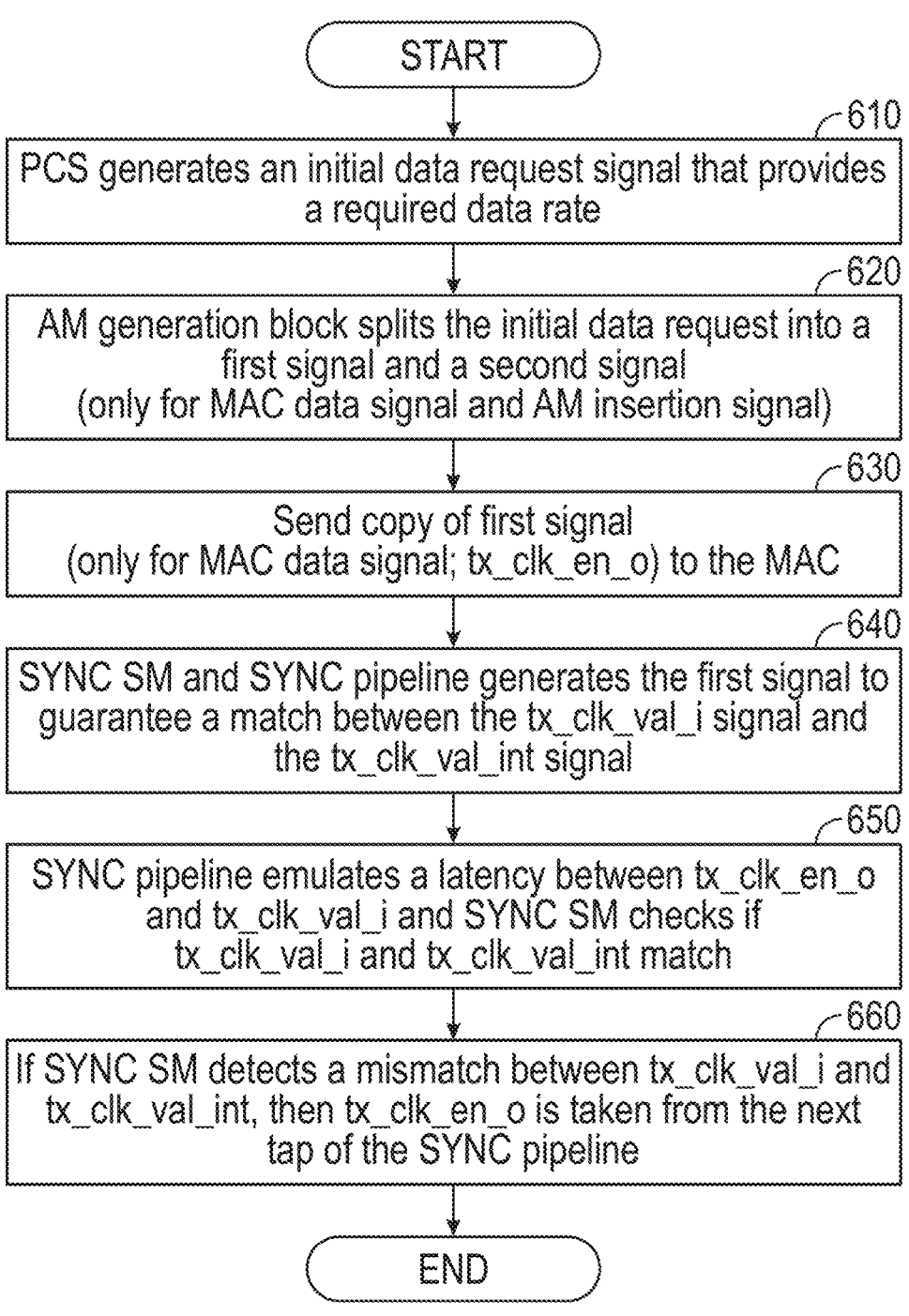
FIG. 6 illustrates a flowchart for using the additional signals between the MAC layer and PCS to eliminate the PCS rate match and the alignment marker (AM) insertion storage, according to one embodiment.

FIG. 6 illustrates a flowchart for using the additional signals between the MAC layer and PCS to eliminate the PCS rate match and the alignment marker (AM) insertion storage.

At 610, the PCS generates an initial data request signal that provides a desired data rate. This signal indicates that the PCS 120 is ready to receive data and specifies the data rate at which the PCS 120 expects to operate.

At 620, the AM generation block splits the initial data request into a first signal and a second signal (only for MAC data signal and AM insertion signal). In other words, the first signal is specifically for the MAC data and directs the MAC layer 110 to begin transmitting regular data frames. The second signal is used for inserting AMs into the data stream.

At 630, a copy of the first signal (only for MAC data signal; tx_clk_en_o) is sent to the MAC layer 110. By sending a copy of the first signal to the MAC layer 110, the PCS 120 directly communicates its readiness and requirements for data transmission. Without this copy, the MAC layer 100 would not know when or how fast to transmit the data. Also, by receiving a copy, the MAC layer 110 can control its data output to prevent overwhelming the PCS 120. Further, by receiving a copy, the MAC layer 110 is aware of the data flow and can accommodate any pauses or adjustments needed for AM insertion.

At 640, the SYNC SM 330 and SYNC pipeline 320 generate the first signal to guarantee a match between the tx_clk_val_i signal and the tx_clk_val_int signal. The data valid 124 indicates when the data communication interface is valid and ready to be read by the receiving system. The data valid 124 indicates that the data has been correctly prepared and is available for processing. The data valid internal (the signal 328) is generated by the SYNC pipeline 320 in the PCS 120 that helps maintain proper synchronization.

At 650, the SYNC pipeline 320 emulates a latency (or delay) between tx_clk_en_o and tx_clk_val_i and the SYNC SM 330 checks if tx_clk_val_i and tx_clk_val_int match.

At 660, if the SYNC SM 330 detects a mismatch between tx_clk_val_i and tx_clk_val_int, then tx_clk_en_o is taken from the next tap of the SYNC pipeline 320.

The example embodiments alter the transmit data path from the MAC to the PCS to eliminate the need for PCS rate matching and alignment marker insertion storage. By reengineering this pathway, it is possible to streamline the data flow, reduce latency, and minimize storage overhead, thereby improving the performance of the communication system. This approach is particularly advantageous in environments where high-speed data transmission and low latency are useful, such as in data centers and high-performance computing networks.

The example embodiments provide for a method and system for better handling TX PCS latency jitter. The example embodiments provide for a MAC to PCS interface. The present MAC to PCS interface includes two additional signals, that is, a data request from the PCS to the MAC layer and a data valid from the MAC layer to the PCS. The first additional signal may be designated as tx_clk_en_o and the second additional signal may be designated as tx_clk_val_i. The tx_clk_val_i is a delayed copy (any number of clocks) of the tx_clk_en_o. This interface allows using a rate control scheme that requests neither Idle manipulation in the PCS nor specific MAC/PCS clock frequency (i.e., only minimum frequency requirements). The data request from the PCS to the MAC (tx_clk_en_o) reflects the data rate at the xMII interface that is used for the serializer/deserializer (SerDes) rate. The present interface with the two additional signals does not impose any extra pipeline limitations between MAC and PCS compared to the standard interface. In operation, an internal copy of the tx_clk_val_i signal (tx_clk_val_int) is generated that has identical timing with the tx_clk_val_i (the data valid signal). The internal tx_clk_val_int is generated by the PCS and is a reference clock enable for the internal data path. If the internally generated tx_clk_val_int and the externally provided tx_clk_val_i do not match each other, the PCS ignores the input data and generates an Idle or remote fault to a link partner. If a match is provided between the tx_clk_val_int and the tx_clk_val_i, synchronization is achieved, and the input data is transmitted from the MAC layer to the PCS.

Moreover, when the PCS can detect a MAC layer malfunction, such as a MAC being under reset or reconfiguration, and still provide valid data to the link partner, it offers several significant benefits for network reliability, performance, and overall system integrity. By providing valid data to the link partner even when the MAC is malfunctioning, the PCS ensures that the link remains active. This prevents the link from dropping, which would otherwise require re-establishing the connection, leading to potential downtime and data loss. During MAC reset or reconfiguration, network operations can continue smoothly because the PCS ensures that the link partner still receives valid/idle stream with AMs. This minimizes disruptions to ongoing communication, which is beneficial in applications involving high availability. Detecting a MAC malfunction and continuing to provide valid data demonstrates robust error handling capabilities. This enhances the fault tolerance of the network, as it can adapt to and manage unexpected conditions without significant degradation in performance. By providing valid data or placeholder data during a MAC malfunction, the PCS helps ensure that the data integrity of the communication link is maintained. This prevents corrupted or incomplete data from being transmitted, which could otherwise lead to data errors or misinterpretations by the link partner, ensuring that the overall system remains in a known good state.

Aspects of the present disclosure relate to circuits, and, in particular, to media access control (MAC) layer to physical coding sublayer (PCS) synchronization circuitry.

In one example, a non-transitory computer-readable medium for storing instructions is provided that, when executed by a processor, cause the processor to use a transmit data path to provide communications between a media access control (MAC) layer logic interface and a physical coding sublayer (PCS) logic interface. The transmit data path includes sending a data transmit signal from the MAC layer logic interface to the PCS logic interface. The transmit data path further includes sending a data request signal from the PCS logic interface to the MAC layer logic interface. The transmit data path further includes sending a data valid signal from the MAC layer logic interface to the PCS logic interface. The data valid signal is a delayed copy of the data request signal such that alignment markers (AMs) propagate to the PCS logic interface without colliding with data from the MAC layer logic interface.

In another example, a system includes a media access control (MAC) layer logic interface and a physical coding sublayer (PCS) logic interface in communication with the MAC layer logic interface via a transmit data path. The transmit data path includes a data transmit signal. The transmit data path also includes a data request signal transmitted from the PCS logic interface to the MAC layer logic interface. The transmit data path also includes a data valid signal transmitted from the MAC layer logic interface to the PCS logic interface. The data valid signal is a delayed copy of the data request signal such that alignment markers (AMs) propagate to the PCS logic interface without colliding with data from the MAC layer logic interface.

In yet another example, a method includes transmitting a data transmit signal from a media access control (MAC) layer to a physical coding sublayer (PCS). The data transmit signal includes input data, a data request signal transmitted from the PCS to the MAC layer, and a data valid signal transmitted from the MAC layer to the PCS. The method further includes generating a copy of the data valid signal having a same timing with the data valid signal. The method also includes determining whether a match exists between the data valid signal and the copy of the data valid signal generated by the PCS to initiate processing of the input data.

Figure 7:
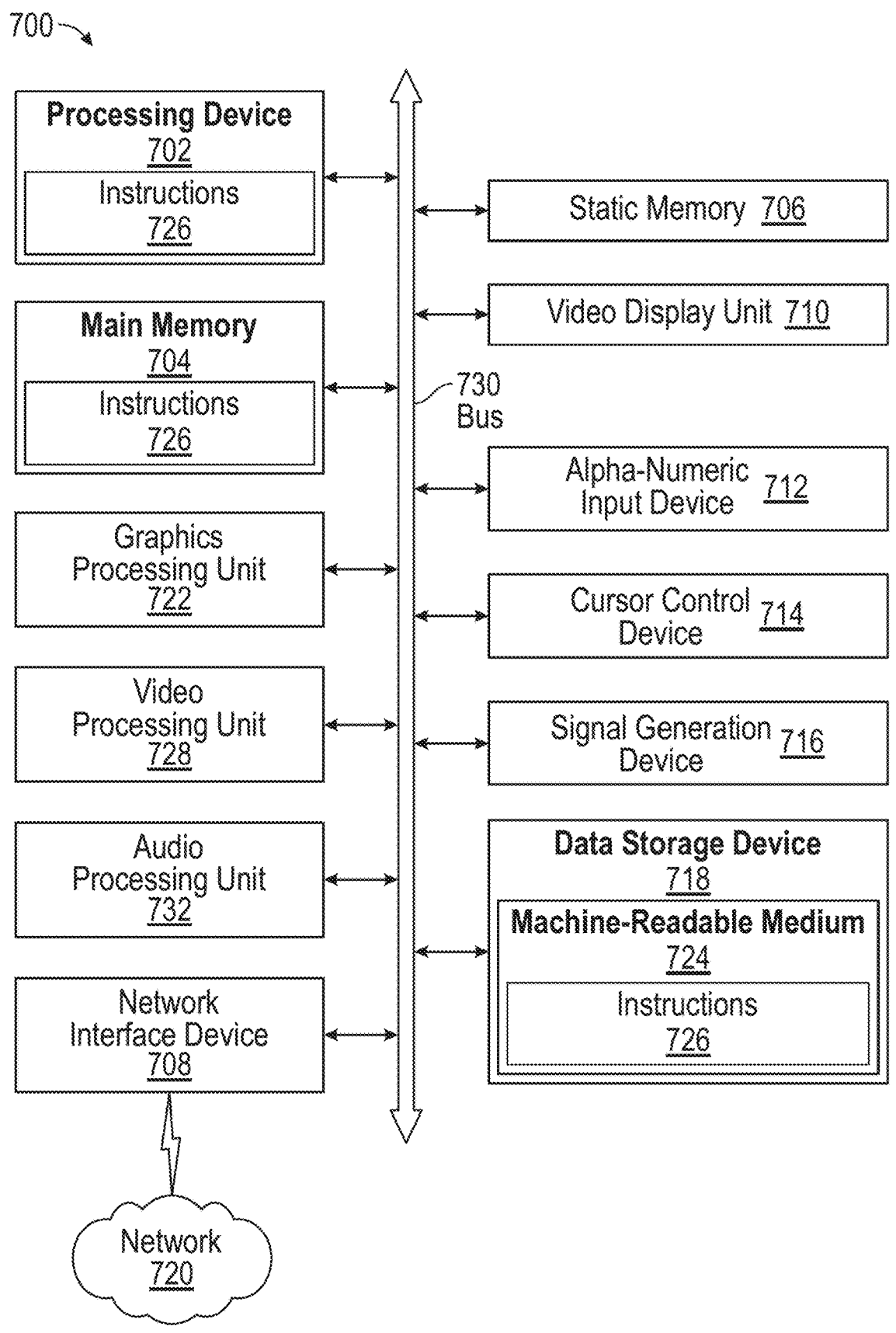
FIG. 7 illustrates an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a local area network (LAN), an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. The processing device 702 may be an integrated circuit (IC) including a plurality of functional blocks, each comprising circuitry to execute tasks. The functional blocks may be processors, microprocessors, system on chips (SoCs), memory ICs, power management ICs, communication ICs, and/or mixed-signal ICs. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Figure 8:
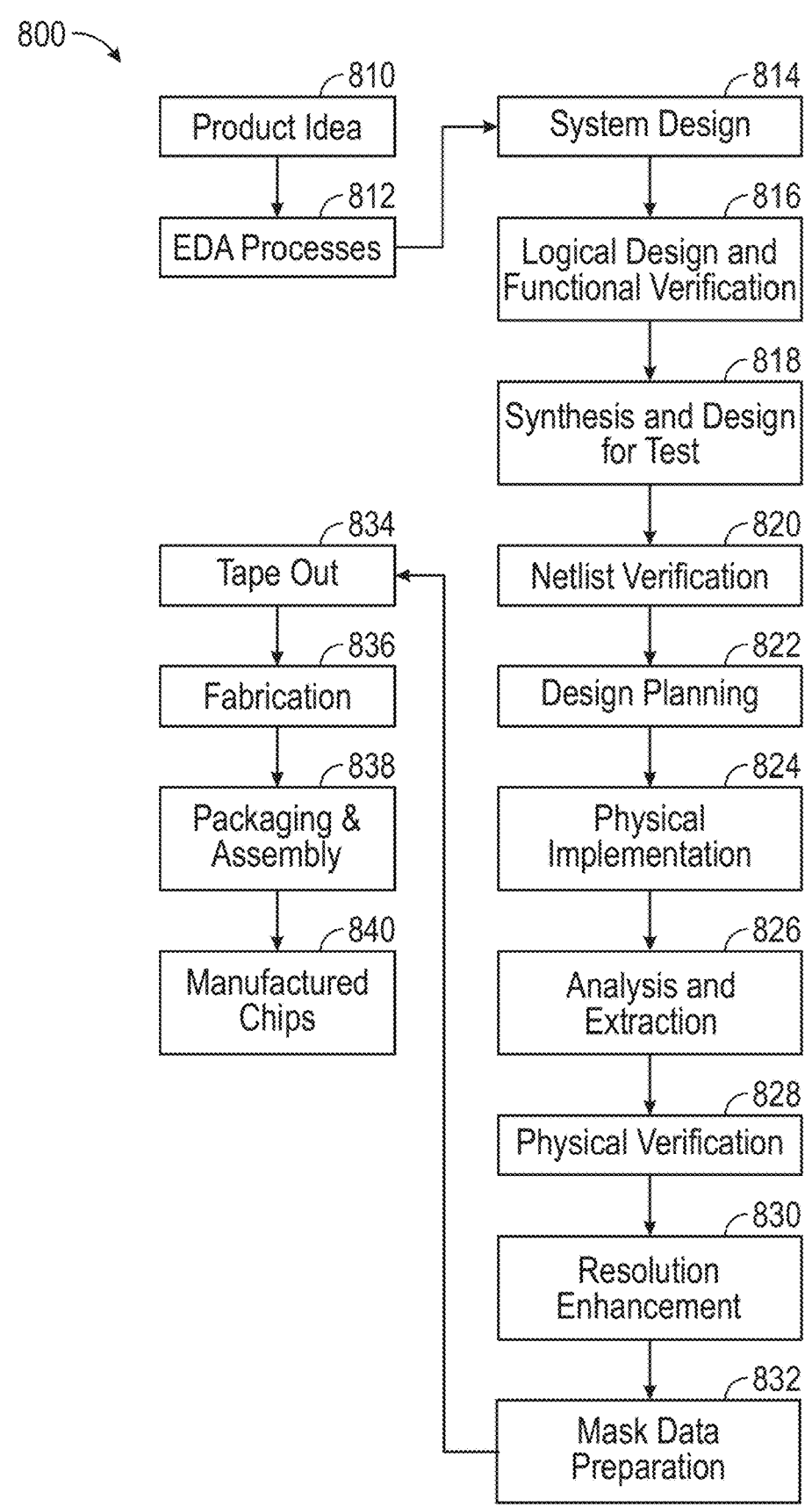
FIG. 8 illustrates an example set of processes used during the design, verification, and fabrication of an article of manufacture such as an integrated circuit to transform and verify design data and instructions that represent the integrated circuit.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementation of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:

a media access control (MAC) layer logic interface; and a physical coding sublayer (PCS) logic interface in communication with the MAC layer logic interface via a transmit data path, wherein the transmit data path includes a data transmit signal, a data request signal transmitted from the PCS logic interface to the MAC layer logic interface, and a data valid signal transmitted from the MAC layer logic interface to the PCS logic interface, wherein the data valid signal is a delayed copy of the data request signal such that alignment markers (AMs) propagate to the PCS logic interface without colliding with data from the MAC layer logic interface.

2. The system of claim 1, wherein the data request signal indicates a desired data rate for PCS data transmission.

3. The system of claim 1, wherein an alignment marker (AM) generation circuit in the PCS logic interface divides the data request signal into a first signal used for MAC layer data and a second signal used for AM insertion.

4. The system of claim 3, wherein the first signal and the second signal are provided to a synchronization (SYNC) pipeline that is in communication with a SYNC state machine (SM), the SYNC pipeline and the SYNC SM being part of the PCS logic interface.

5. The system of claim 1, wherein the PCS logic interface toggles the data request signal to match a desired data rate for PCS data transmission.

6. The system of claim 5, wherein the MAC layer logic interface follows the toggling of the data request signal by toggling the data valid signal.

7. The system of claim 1, wherein a SYNC pipeline of the PCS logic interface generates a copy of the data valid signal that is synchronized with the data valid signal.

8. The system of claim 7, wherein, when the data valid signal from the MAC layer logic interface to the PCS logic interface matches the copy of the data valid signal generated by the PCS logic interface, the PCS logic interface is in synchronization with the MAC layer logic interface.

9. The system of claim 7, wherein, when the data valid signal from the MAC layer logic interface to the PCS logic interface does not match the copy of the data valid signal generated by the PCS logic interface, the PCS logic interface ignores input data from the MAC layer logic interface and generates an idle symbol to a link partner.

10. The system of claim 7, wherein the SYNC pipeline includes a shift register that compensates for a delay between the data valid signal and the copy of the data valid signal generated by the PCS logic interface.

11. A non-transitory computer-readable medium storing instructions that, when executed by a processor, cause the processor to:

use a transmit data path to provide communications between a media access control (MAC) layer logic interface and a physical coding sublayer (PCS) logic interface, the transmit data path including:

sending a data transmit signal from the MAC layer logic interface to the PCS logic interface;

sending a data request signal from the PCS logic interface to the MAC layer logic interface; and sending a data valid signal from the MAC layer logic interface to the PCS logic interface, wherein the data valid signal is a delayed copy of the data request signal such that alignment markers (AMs) propagate to the PCS logic interface without colliding with data from the MAC layer logic interface.

12. The non-transitory computer-readable medium of claim 11, wherein a SYNC pipeline of the PCS logic interface generates a copy of the data valid signal that is synchronized with the data valid signal.

13. The non-transitory computer-readable medium of claim 12, wherein, when the data valid signal from the MAC layer logic interface to the PCS logic interface matches the copy of the data valid signal generated by the PCS logic interface, the PCS logic interface is in synchronization with the MAC layer logic interface.

14. The non-transitory computer-readable medium of claim 12, wherein, when the data valid signal from the MAC layer logic interface to the PCS logic interface does not match the copy of the data valid signal generated by the PCS logic interface, the PCS logic interface ignores input data from the MAC layer logic interface and generates an idle symbol to a link partner.

15. The non-transitory computer-readable medium of claim 12, wherein the SYNC pipeline includes a shift register that compensates for a delay between the data valid signal and the copy of the data valid signal generated by the PCS logic interface.

16. The non-transitory computer-readable medium of claim 12, wherein the PCS logic interface toggles the data request signal to match a desired data rate for PCS data transmission.

17. The non-transitory computer-readable medium of claim 16, wherein the MAC layer logic interface follows the toggling of the data request signal by toggling the data valid signal.

18. A method comprising:

transmitting a data transmit signal from a media access control (MAC) layer logic interface to a physical coding sublayer (PCS) logic interface, the data transmit signal including input data;

transmitting a data request signal from the PCS logic interface to the MAC layer logic interface;

transmitting a data valid signal from the MAC layer logic interface to the PCS logic interface;

generating, by the PCS logic interface, a copy of the data valid signal having a same timing with the data valid signal; and determining whether a match exists between the data valid signal and the copy of the data valid signal generated by the PCS logic interface to initiate processing of the input data.

19. The method of claim 18, wherein the PCS logic interface toggles the data request signal to match a desired data rate for PCS data transmission.

20. The method of claim 19, wherein the MAC layer logic interface follows the toggling of the data request signal by toggling the data valid signal.

* * * * *